Figure 1:
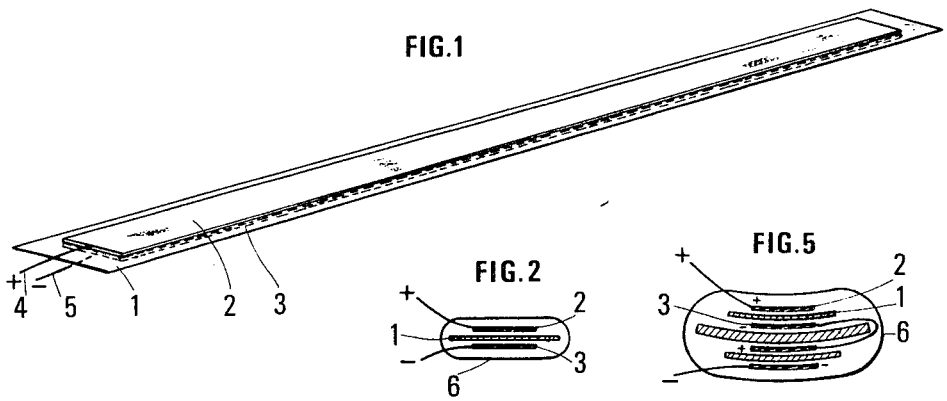

United States Patent [19]
Cassand et al.

[11] 3,798,474
[45] Mar. 19, 1974

[54] PRESSURE WAVE PIEZOELECTRIC SENSOR OF CONTINUOUS STRUCTURE

[75] Inventors: Jean Cassand, Rueil-Malmaison; Jean-Claude Dubois, Royan; Jacques Cholet, Rueil-Malmaison, all of France

[73] Assignee: Institut Francais du Petroles, des Carburants et Lubrifiants, Rueil-Malmaison, France

[22] Filed: July 5, 1972

[21] Appl. No.: 269,092

[30] Foreign Application Priority Data
July 8, 1971 France .............................. 71.25137

[52] U.S. Cl. ..................... 310/9.6, 310/8.5, 310/8.6, 340/10
[51] Int. Cl. ............................................. H04r 17/00
[58] Field of Search .............. 310/8.3, 8.5, 8.6, 9.6; 340/10, 17

[56] References Cited
UNITED STATES PATENTS

| | | |
|---|---|---|
| 2,434,143 | 1/1948 | Chilowsky ............................. 340/10 |
| 2,420,864 | 5/1947 | Chilowsky ............................. 340/10 |
| 3,070,775 | 12/1962 | Andrews, Jr. ...................... 310/0.6 X |
| 3,604,958 | 9/1971 | Palini ............................... 310/8.5 X |
| 3,336,573 | 8/1967 | Gallaway et al. ................. 340/10 X |
| 3,325,780 | 6/1967 | Horan ............................. 310/8.5 X |

*Primary Examiner*—Gerald Goldberg
*Assistant Examiner*—Mark O. Budd
*Attorney, Agent, or Firm*—Craig & Antonelli

[57] ABSTRACT

Pressure wave sensor formed of at least one elongated piezoelectric element having two faces, each associated to a flexible conducting electrode substantially over the whole length of the sensitive element.

When the sensor is formed of a plurality of sensitive elements the latter are electrically connected to one another.

10 Claims, 13 Drawing Figures

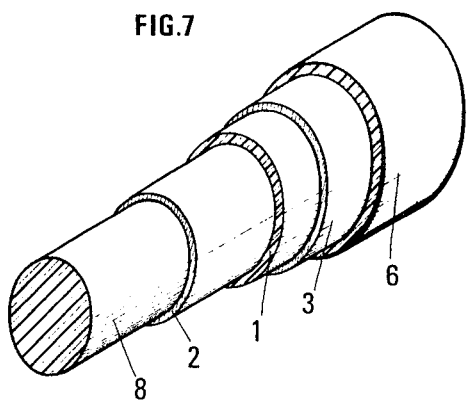
FIG.7
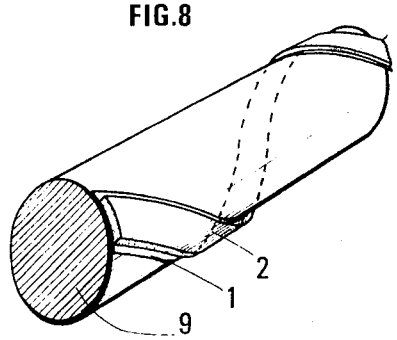
FIG.8
FIG.11
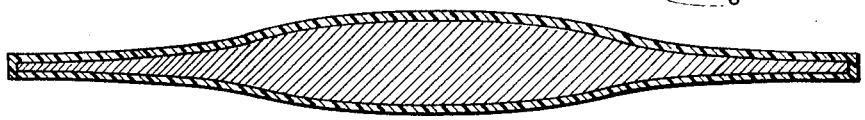
FIG.10
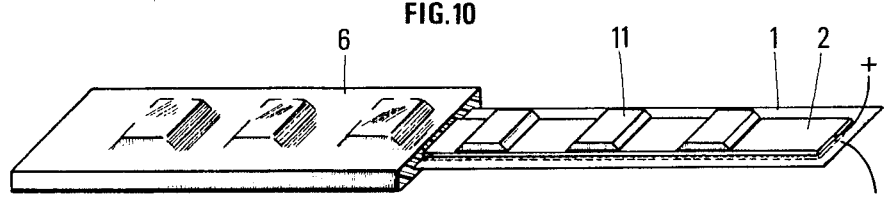
FIG.12
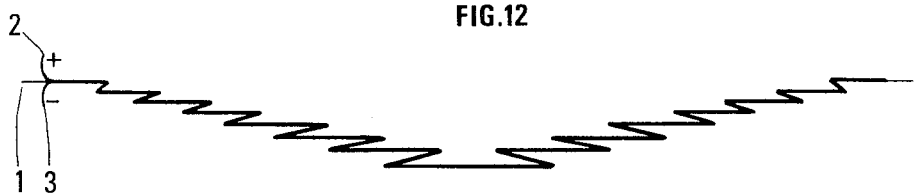
FIG.13
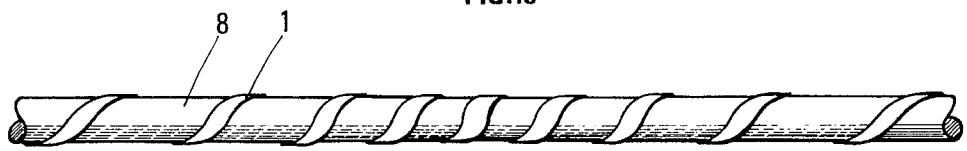

3,798,474

PRESSURE WAVE PIEZOELECTRIC SENSOR OF CONTINUOUS STRUCTURE

This invention relates to a pressure wave sensor of continuous structure over a great length, making use of the piezoelectric effect.

Sensors of great length and continuous structure are already known from the U.S. Pat. No. 2,965,877 which describes a hydrophone with capacitive effect in which the capacity between the two armatures of a capacitor, consisting respectively of an electrode of the sensor and the sea, varies in relation with the pressure applied to the sensor.

The capacity variations are converted to electrical signals by means of electronic circuits of a conventional type, The U.S. Pat. No. 3,317,891 also described a hydrophone of continuous structure wherein the resistance variations of conductors forming part of the sensor are converted to electrical signals.

The pressure wave sensor according to this invention, particularly useful for measuring the pressure variations resulting from seismic vibrations either in the sea or on the earth, is of the piezoelectric type. It consists essentially of a long strip of flexible material having piezoelectric properties and the faces of which are each associated with an electric conductor. This sensor, in addition to the easiness of its manufacture, offers the further advantage, with respect to the above-mentioned systems, of avoiding the use of complex and expensive electronic circuits since the electrical signals corresponding to the pressure variations on the sensor are directly produced piezoelectrically. It is accordingly possible to make use of the sensor according to the invention in association with conventional seismic apparatuses.

The new sensor according to the invention also offers obvious advantages with respect to the piezoelectric conventional sensing assemblies presently used at sea, which are formed of a multiplicity of rigid individual sensors comprising rigid piezoelectric elements (quartz, ceramic , . . . ) and spaced apart from one another in a flexible sheath, this multiplicity of separate sensors being necessary in order to obtain a certain flexibility of the assembly in association with a good directivity.

The flexible piezoelectric strip of the sensor according to the invention may be made of a plastic material such as polyethylenpterephthalate, polyamide, polyvinyle . . . , having piezoelectric properties. These properties may be natural or conferred to the material by means of a particular treatment such as for example by placing said material in a high electric field.

Figure 2:
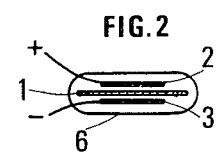
Figure 5:
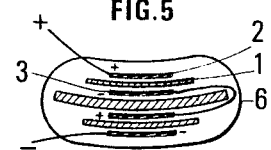
Figure 3:
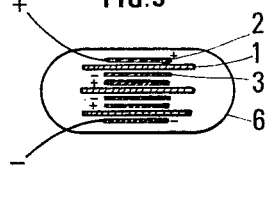
Figure 4:
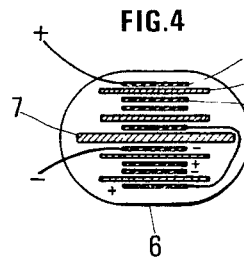
Figure 6:
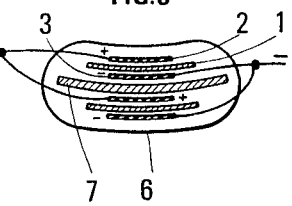
Figure 9:
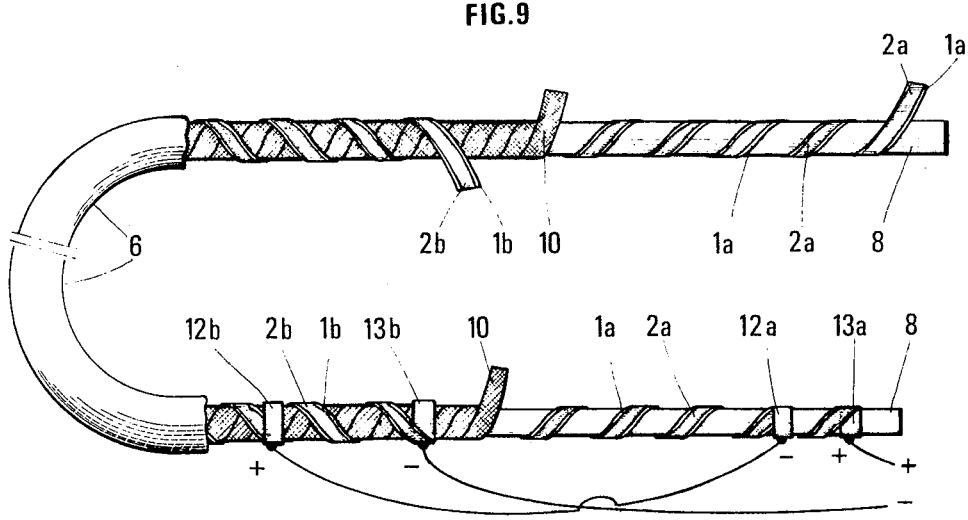

Various embodiments of sensors according to the invention will be described hereinafter by way of non-limitative examples, with reference to the accompanying drawings wherein :

FIG. 1 diagrammatically shows a first embodiment of a flat shaped sensor,

FIG. 2 is a cross- sectional view of the sensor of FIG. 1,

FIG. 3 is a cross-sectional view of a second embodiment of sensor formed of piled up elements of the same polarity, FIG. 4 is a cross-sectional view of a third embodiment of sensor in the form of a pile of elements of inverse polarity, FIG. 5 diagrammatically shows another arrangement of sensor comprising two sensitive elements in association with their electrodes of the same polarity, secured on both sides of an insulating strip and connected in series, FIG. 6 shows another arrangement of the sensor, in which the sensitive elements are placed like in FIG. 5 but with electrodes connected in parallel, FIG. 7 diagrammatically shows a cross-section of a fourth embodiment of sensor, of cylindrical shape having a sensitive element and conductors of annular shape, FIG. 8 is a cross-sectional view of a fifth embodiment of sensor of cylindrical shape with one cylindrical electrode associated to the sensitive element and one helical electrode, FIG. 9 diagrammatically shows a sixth embodiment of sensor, of cylindrical shape, comprising two elements of the type shown in FIG. 1, helically wound and superimposed with inverse polarities, FIG. 10 diagrammatically shows another arrangement of the embodiment of FIG. 1, particularly adapted for prospection on earth, FIG. 11 diagrammatically shows a sensor of the type illustrated in FIG. 1 but with a sensitive strip element of varying width, FIG. 12 diagrammatically shows a sensor of the type illustrated in FIG. 1 but with an accordion pleating, and FIG. 13 diagrammatically shows a sensor of the type illustrated in FIGS. 6 or 7 but with the sensing element wound in helices of variable pitch.

The sensor according to the invention, as shown in FIGS. 1 and 2, comprises a pressure sensitive element formed of a flexible strip 1 of plastic material having piezoelectric properties, as above-stated. Two flat electrodes 2 and 3 are associated to the sensitive strip, on both sides thereof. They may consist of a metal coating with small metal particles deposited on the sensitive strip or of two thin metal strips each in contact with a separate face of the sensitive strip.

Electric conductors 4 and 5 connect the electrodes to the signal recording apparatuses, not shown. An insulating sheath 6 of flexible material, shown in FIG. 2, covers the assembly shown in FIG. 1.

According to a second embodiment of sensor , shown in FIG. 3, a number $n$ of assemblies "sensitive element + electrodes" of the type shown in FIG. 1, are piled up and connected in series. Such arrangement results in an increased sensitivity of the sensor. $S$ being the sensitivity of one assembly of the type shown in FIG. 1, and $C$ being its capacity, the sensitivity of the arrangement shown in FIG. 3 is $nS$ and its capacity $C/n$.

Other embodiments of sensor are adapted to obviate the drawbacks resulting from the flexion. As a matter of fact, a flexion imparted to the sensitive element generates within the plastic strip compressions or expansions which produce electric charges. The resulting signals are parasitic for the seismic information.

In the arrangement illustrated in FIG. 4, two sensing assemblies of the type shown in FIGS. 2 or 3 are associated together and placed respectively on a different side of a strip 7 made of flexible insulating material.

In the case where the sensors placed on both sides of the insulating support 7 are not rigidly connected thereto, they undergo substantially the same flexion and deliver charges of the same sign if their polarity is in the same direction. In order to nullify these parasitic charges it is therefore convenient to reverse said polarity, as it is illustrated in FIG. 4.

In the case where two sensitive elements are rigidly connected to each other, when a flexion stress is applied thereto, one of the elements is subjected to a compression and the other to an expansion. They consequently deliver at that time parasitic electric charges of opposite signs. The polarity of the two elements must have, in that case, the same orientation in order to nullify the resultant charge.

This case is illustrated in FIG. 5 where the electrodes are connected in series and in FIG. 6 where the electrodes are connected in parallel.

FIG. 7 shows a sensor according to the invention, of a cylindrical shape. It comprises essentially a sensitive element 1 of flexible plastic material having piezoelectric properties, associated with two electrodes 2 and 3 also cylindrical, placed respectively inwardly and outwardly with respect to the sensitive element and consisting for example of a metal coating of said element. A cylindrical central core 8 of flexible insulating material is used as support for the assembly, which is covered with a flexible insulating sheath 6.

FIG. 8 shows an embodiment of sensor according to which one of the electrodes is a central core 9 of cylindrical shape made of a conducting material. The sensitive element 1 consists of a flexible piezoelectric strip of plastic material helically wound around the conducting core 9.

The other electrode 2, associated to the sensitive element 1, is also helically wound.

The sensor embodiment illustrated by way of example in FIG. 9 is formed essentially of an insulating cylindrical core 8 around which is helically wound a piezoelectric sensitive strip 1 $a$, associated with two electrodes 2 $a$ and 3 $a$ (The latter is not shown in the drawing).

This assembly is covered with an insulating element, for example a strip 10 of insulating material wound on the preceding elements of the sensor.

A second assembly, comprising another sensitive element 1 $b$ with its associated electrodes 2 $b$ and 3 $b$ (3 $b$ is not shown), is helically wound on the insulating strip 10 but in a reverse direction with respect to the winding of the assembly 1 $a$, 2 $a$, 3 $a$, the polarity of electrodes 2 $b$ and 3 $b$ being opposite to that of electrodes 2 $a$ and 3 $a$. The whole is coated with a protecting sheath 6 of flexible insulating material.

At the end of the sensor, the electrodes 2 $a$ and 2 $b$ are electrically connected by means of conducting rings 12 $a$ and 12 $b$, the electrodes 3 $a$ and 3 $b$, which are not shown in the drawing, being electrically connected to an amplifier (not shown) through conducting rings 13 $a$ and 13 $b$.

The arrangement of this sensor embodiment offers the advantage of a double compensation of the flexion effects : a first compensation, according to the principle illustrated in FIG. 4, resulting from the opposite polarities of the conductors and the second compensation resulting from the fact that, over a given length of the sensor to which is applied a flexion, the number of convolution portions which are subjected to a traction stress is the same as the number of convolution portions which are subjected to a compression stress.

Obviously a sensor of the type shown by way of example in FIG. 9 may have only one convolution or several superimposed convolutions connected in the manner illustrated in FIGS. 3 or 4.

The above-described sensor embodiments are particularly adapted for pressure measurements in water.

However the sensor of continuous structure may also be adapted to the use on the earth, as it is illustrated in FIG. 10.

In this case there is used a sensor of flat shape (of the type shown in FIG. 1 or FIGS. 3 or 4) and small masses 11, e.g., of lead, are provided on one face thereof, in order to maintain the opposite face of the sensor in contact with the ground. These small masses may be placed for example in a flexible sheath 6 which maintain them in position.

The sensor according to the invention may also be so designed as to weight the sensitivity in different zones of the sensor by the distance of these zones from the center of the device, in order to improve the directivity of the sensor.

For example, in the case of a sensitive element in form of a strip, the width of said strip may be varied and be, for example greater at the center than at the end parts (FIG. 11).

It is also possible to pleat the strip so that the concentration of the folds be greater towards the center than at the end parts (FIG. 12).

In the case of a sensor of cylindrical shape the winding pitch of the sensitive strip may be varied. This pitch will be greater at the end parts of the sensor than at its center where, accordingly, the concentration of convolutions of the sensitive element will be greater (FIG. 13).

It must be understood that the various above-described embodiments have been given only by way of example, since other arrangements combining features shown in the accompanying drawings may be made without departing from the spirit and the scope of this invention. Consequently such modified arrangements are properly, equitably and intended to be within the full range of equivalence of the following claims.

What we claim is:

1. A pressure wave sensor of continuous structure comprising essentially at least one piezoelectric sensitive element of plastic synthetic material having two faces of great length as compared to their width, each associated with a flexible conducting electrode substantially of the same length as the sensitive element, said element associated with the electrodes being helically wound around a central core of great length, made of flexible and electrically insulating material.

2. A sensor according to claim 1 wherein the electrodes are thin metal strips in contact with the sensitive element.

3. A sensor according to claim 1, wherein the electrodes consist of a metal coating formed of small metal particles directly deposited on each face of the sensitive element.

4. A pressure wave sensor according to claim 1, wherein the sensitive element associated with the electrode is wound around the central core with a winding pitch smaller at the central portion of said core than at the end portions thereof.

5. A pressure wave sensor of continuous structure, comprising essentially at least one piezoelectric sensitive element of plastic synthetic material having two faces of great length as compared to their width, each being associated with a conducting electrode substantially of the same length as the sensitive element, one of the electrodes being a cylindrical conducting core around which are helically wound the sensitive element and the other electrode, the latter being secured onto the external face of said sensitive element.

6. A pressure wave sensor according to claim 5, wherein the sensitive element associated with the electrode is wound around the conducting core with a winding pitch smaller at the central portion of said core than at the end portions thereof.

7. A pressure wave sensor, of continuous structure comprising essentially at least a pair of sensitive elements of plastic synthetic material having two faces of great length as compared to their width, each associated with a conducting electrode substantially of the same length as the sensitive elements, said elements associated with their respective electrodes being helically wound in reverse directions around an insulating central core.

8. A pressure wave sensor according to claim 7, wherein insulating means is interposed between the two sensitive elements.

9. A pressure wave sensor according to claim 8, wherein one of the electrodes associated with one side of a sensitive element is electrically connected with the electrode on the corresponding side of the other sensitive element.

10. A pressure wave sensor of continuous structure comprising at least one piezoelectric sensitive flat strip of plastic synthetic material having two faces of great length as compared to their width each associated with a flexible conducting electrode substantially of the same length as the sensitive element, the flat strip being pleated with a greater concentration of folds at its center than at its end parts.

* * * * *